United States Patent [19]
Cunningham et al.

[11] Patent Number: 5,238,386
[45] Date of Patent: Aug. 24, 1993

[54] MULTI-PART EXTRUSION DIE

[75] Inventors: George M. Cunningham, Horseheads; G. Daniel Lipp, Painted Post; Lawrence S. Rajnik, Corning, all of N.Y.

[73] Assignee: Corning Incorporated, Corning, N.Y.

[21] Appl. No.: 886,321

[22] Filed: May 20, 1992

[51] Int. Cl.⁵ ............................................. B29C 47/12
[52] U.S. Cl. ............................ 425/192 R; 264/177.12; 425/462; 425/467
[58] Field of Search ............... 425/192 R, 462, 464, 425/467, 463, 183, 186; 264/177.12

[56] References Cited

U.S. PATENT DOCUMENTS

| | | | |
|---|---|---|---|
| 3,038,201 | 6/1962 | Harkenrider | 425/464 |
| 3,790,654 | 2/1974 | Bagley | 425/464 |
| 4,118,456 | 10/1978 | Blanding et al. | 425/464 |
| 4,242,075 | 12/1980 | Higuchi et al. | 425/462 |
| 4,354,820 | 10/1982 | Yamamoto et al. | 425/461 |
| 4,465,652 | 8/1984 | Lentz | 425/464 |
| 4,486,934 | 12/1984 | Reed | 264/177.12 |
| 4,687,433 | 8/1987 | Ozaki et al. | 425/464 |
| 4,731,010 | 3/1988 | Cunningham | 264/177.12 |
| 4,743,191 | 5/1988 | Chao | 425/190 |
| 4,877,766 | 10/1989 | Frost | 502/439 |
| 4,902,216 | 2/1990 | Cunningham et al. | 425/463 |
| 4,984,487 | 1/1991 | Beckmeyer | 76/107.1 |
| 5,108,685 | 4/1992 | Kragle | 264/177.12 |

Primary Examiner—Khanh P. Nguyen
Attorney, Agent, or Firm—B. R. Turner

[57] ABSTRACT

A multi-part extrusion die is disclosed which not only permits the formation of thin discharge slots down to about 0.003 or 0.002 inches, but also provides the ability to produce a die for forming a honeycomb article with different cell densities and web thicknesses in various sections. A plurality of individual die parts are each provided with discharge slots in a discharge face thereof of desired width and spacing, and then a plurality of such individual die parts are secured together in a desired alignment such that the discharge face of each of the plurality of die parts forms a continuous discharge face for the multi-part extrusion die.

14 Claims, 5 Drawing Sheets

MULTI-PART EXTRUSION DIE

BACKGROUND OF THE INVENTION

This invention relates to the art of producing extrusion dies for extruding thin-walled honeycomb structures, such as those that would have utility as a catalyst substrate or as a diesel particulate filter. Such honeycomb articles may be formed from extrudable material such as particulate ceramic and/or metal batch which may be sintered, and similar materials which have the property of being able to flow or plastically deform during extrusion, while being able to become sufficiently rigid immediately thereafter so as to maintain their structural integrity. In the past, conventional extrusion dies usually consisted of a metal plate with an array of feed holes formed in one face thereof which do not extend entirely through the die, and an array of thin intersecting slots formed in an opposite face of the die which are only deep enough to intersect the feed holes. The batch material to be extruded is forced under pressure into the feedholes and on into and through the interconnected slot array so as to exit the die as a honeycomb structure defined by the slots.

In many of the applications for which the honeycomb structures are intended, such as a catalyst substrate, there are many advantages in making the walls of the honeycomb article as thin as possible. The utilization of thinner walls within the honeycomb structure results in greater open frontal area, lower resistance to the flow of gases through the honeycomb structure, greater permeability, and lower loading of expensive catalysts on the surface of the walls. However, in order to make thinner walls or webs within the extruded honeycomb structure, it is necessary to make thinner discharge slots. Currently, the thinnest slots are made by the wire electrical discharge machining process (wire EDM process). A major problem exists, however, as this technology is extended to thinner and thinner slots, since it becomes difficult to control the cutting wire for large spans, and accordingly the length of a slot that can be accurately and uniformly cut is limited.

That is, during the wire EDM cutting operation, a force is exerted on the wire, with the tendency of the wire to bow, resulting in deeper cuts adjacent the edges of the die as opposed to central portions thereof. Although tension is applied to the wire, there is a limit to which such tension can be applied due to the structural integrity of the thin wire.

The prior art has set forth various forms of multi-part extrusion die apparatus, however, such art neither suggests the structural concept of a multi-part die in which each part having a discharge face contains a plurality of discharge slots and feed holes formed within the body thereof, nor the slot limitation reason for forming such multiple die parts.

U.S. Pat. No. 3,038,201 to Harkenrider relates to a generally complex multiple tube or core construction of an extrusion apparatus, wherein spaces between the outer edges of adjacent cores form both the feed holes and the discharge slots.

U.S. Pat. No. 3,790,654 to Bagley discloses an extrusion apparatus for forming thin-walled honeycombed structures wherein a central die is surrounded by an adjustable skin-forming slot. Alternatively, slots could be formed partially in adjacent plates.

U.S. Pat. No. 4,118,456 to Blanding et al. relates to an extrusion die formed of two body members, with the first body member having a plurality of large feed holes, and the second body member having a plurality of smaller feed holes communicating between the large feed holes and discharge slots.

U.S. Pat. No. 4,354,820 to Yamamoto et al. relates to a two-part extrusion die for forming honeycomb structures wherein feed holes and pooling slots are formed in one part of the die, and discharge slots are formed in the other.

U.S. Pat. No. 4,465,652 to Lentz relates to a laminated extrusion die blade support wherein the laminated plates have feed holes and discharge slots formed between the plates, rather than within the body of such plates.

U.S. Pat. No. 4,743,191 to Chao relates to a multi-piece die for forming honeycomb structures wherein feed holes are formed in a top die, but discharge slots are formed between the two parts of the die rather than within the die body parts per se.

U.S. Pat. No. 4,877,766 to Frost relates to a die for forming a mini-monolith substrate wherein both slots and feed holes are formed between telescoping tubes, rather than being formed within the body parts per se.

U.S. Pat. No. 4,984,487 to Beckmeyer discloses a die having feed holes which are within tubes, but discharge slots are formed between individual teeth blocks, and are not formed within a die body.

It thus has been an object of the invention to produce large commercial extrusion dies with uniform thin discharge slots, by first forming uniform thin slots within die parts of limited size, and then joining such parts together to form a multipart extrusion die.

A further object of the invention has been to produce an extrusion die with different cell densities or slot widths in various sections of the die, utilizing the multi-part technology of the present invention to produce unique flow characteristics within the die structure.

SUMMARY OF THE INVENTION

In its simplest form, the present invention sets forth a novel extrusion die structure and method of forming, wherein uniform thin discharge slots, down to a width of about 0.003" or 0.002", are formed across the expanse of a commercial extrusion die, which may have a 6" to 10" or larger expanse, by first forming such uniform thin slots in a plurality of relatively small die parts having an expanse of from under 1" to up to 3" or 4". The individual die parts are then accurately positioned and joined together to form an overall multi-part extrusion die. Each of the parts are provided with feed holes in a face opposite to that which the thin discharge slots are formed, and extend inwardly within the die part to communicate with the discharge slots.

Further, where it is desired to produce an extrusion die having variable cell densities or slot widths, the formation of the discharge slots within each of the relative small parts may be varied from part-to-part, so as to produce a unique discharge pattern for specialized applications where the width of the discharge slots and/or the cell density desired may vary across the expanse of the discharge face of the extrusion die. The fact that each of the individual relatively small parts are first provided with discharge slots of desired width and cell density, allows the formation of specialized extrusion dies when the various parts are joined together to form the overall multi-part extrusion die.

DESCRIPTION OF THE PREFERRED EMBODIMENTS

In view of the fact that the length of a discharge slot which can be uniformly cut into an extrusion die part is limited by the integrity of commercially available EDM wire, particularly when forming thin slots with a width of down to about 0.003" or 0.002", the present invention sets forth a new concept for producing extrusion dies which alleviate this problem and permit thin slot dies to be made in large commercial sizes. The basic concept of the invention resides in the formation of a plurality of small die parts or tiles, which are individually complete, but which are then positioned and secured together to form an overall larger multi-part extrusion die. There is, of course, some length of EDM wire which is useable to produce a uniform slot for any given wire diameter. For instance, if an EDM wire having a diameter of 0.002" may produce a uniform slotting in a die part of up to 1" long in the direction parallel to the slot, to make a die of any arbitrarily larger size by the present invention, small pieces of dies, not exceeding 1" in length, are provided with uniform discharge slots using the 0.002" diameter wire with an EDM process, and such small die parts are assembled like tiles to produce a complete die. The individual tiles or small die pieces may be secured together in the desired alignment by brazing such plurality of individual tiles or die parts to a body plate, by fitting them together by tongue and grooves in a compressive frame, or a combination of brazing and press fitting the die parts. Also, other fastening schemes may be employed such as soldering, diffusion bonding, bolting, and etc., as long as they maintain the alignment of the slots from piece to piece, and the structural integrity of the assembled die is maintained when subjected to extrusion pressures.

Figure 1:
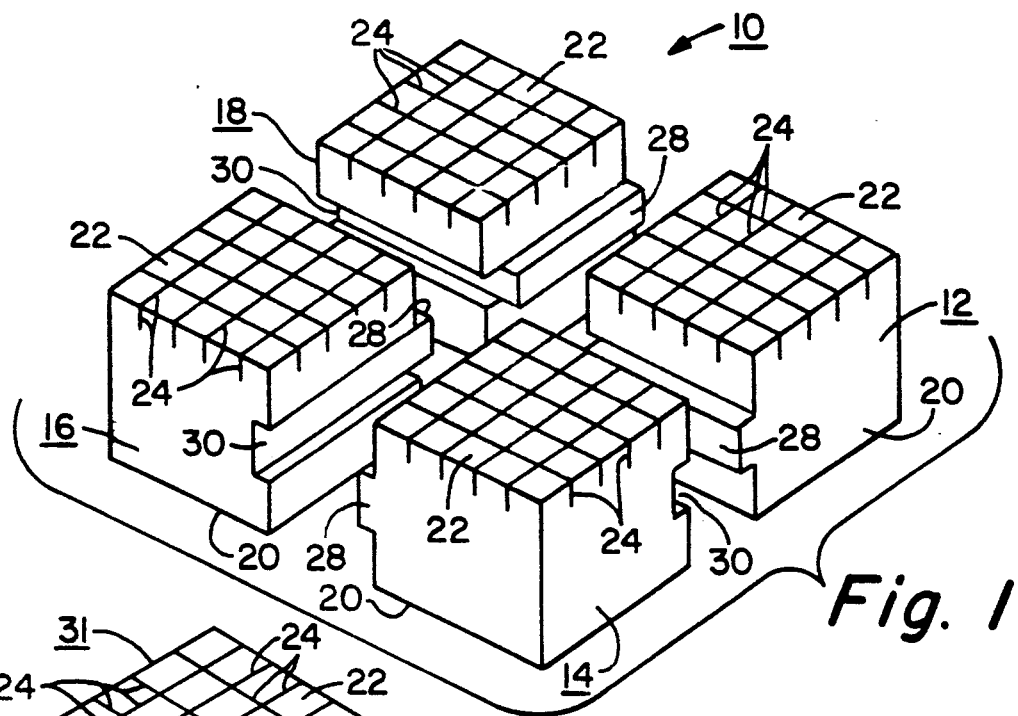
FIG. 1 is a schematic perspective illustration of one embodiment of a multi-part extrusion die, showing the orientation of the individual die parts prior to assembly.

Referring now to FIG. 1, a multi-part extrusion die 10 is shown comprising four die parts 12, 14, 16 and 18, prior to their assembly into the composite die. Each of the die parts 12, 14, 16, and 18 has a die body with an inlet face 20 and an opposite discharge face 22. Each discharge face 22 is provided with a network or plurality of interconnecting thin discharge slots 24 formed by the wire EDM process. The inlet face 20 of each of the die parts is provided with a plurality of feed holes 26 which extend within the die body from the inlet face 20 to root portions 25 of the discharge slots, which are within and bounded by the die body (see FIGS. 5 and 7).

The die pieces or tiles, 12, 14, 16, and 18 are each provided with a tongue 28 and a groove 30. Accordingly, the four die pieces or parts 12, 14, 16 and 18 can be assembled by the tongue and groove method utilizing tongues 28 and grooves 30 to make the slot length within the multi-part extrusion die 10 twice as large as the minimum slot length 24 produced in the discharge face 22 of each die part. The preferred method of manufacture is to form the thin discharge slots 24 by the wire EDM process in the discharge face of each die part 12, 14, 16 and 18, and then aligning and assembling the four die parts in a press-fit or compression frame, such as shown at 60 in FIG. 8. The feed holes 26 can then be drilled in the assembly to connect with the root portions 25 of the thin discharge slots 24, such that the discharge slots 24 and the feed holes 26 are formed within the body of the die parts 12, 14, 16 and 18. That is, the slots and feed holes are interiorly of the body, and are bounded by the die part per se. However, if desired, the feed holes could be drilled in the separate pieces and then the assembly could be accomplished by other means such as brazing, soldering, diffusion bonding, and so forth.

Figure 2:
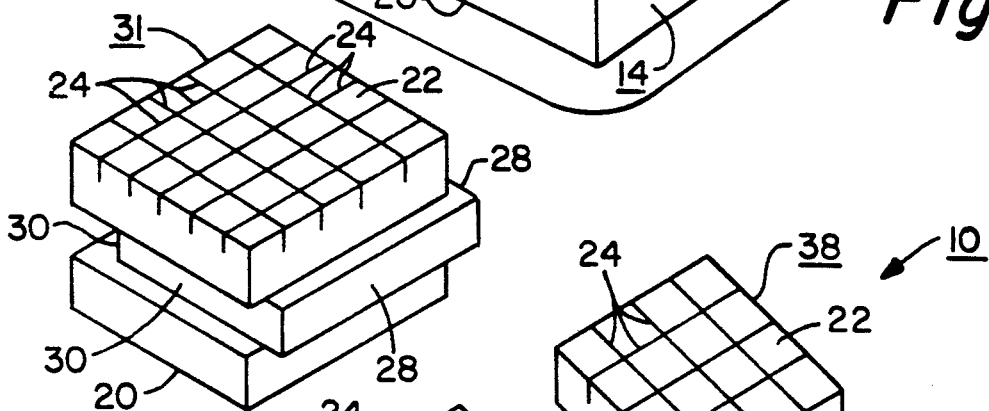
FIG. 2 is a schematic perspective illustration of a further embodiment of a die-part.

FIG. 2 shows a die part 31, similar to those shown in FIG. 1, except that it is provided with tongues 28 on two sides and grooves 30 on two sides, so that it is tongued and grooved on all four faces for tiling into an array of more than four pieces. As more and more die parts are assembled in this way, the structural integrity of the multi-part extrusion die 10 may be somewhat diminished, and accordingly it may be necessary to both braze and press-fit the die to provide adequate strength.

Figure 3:
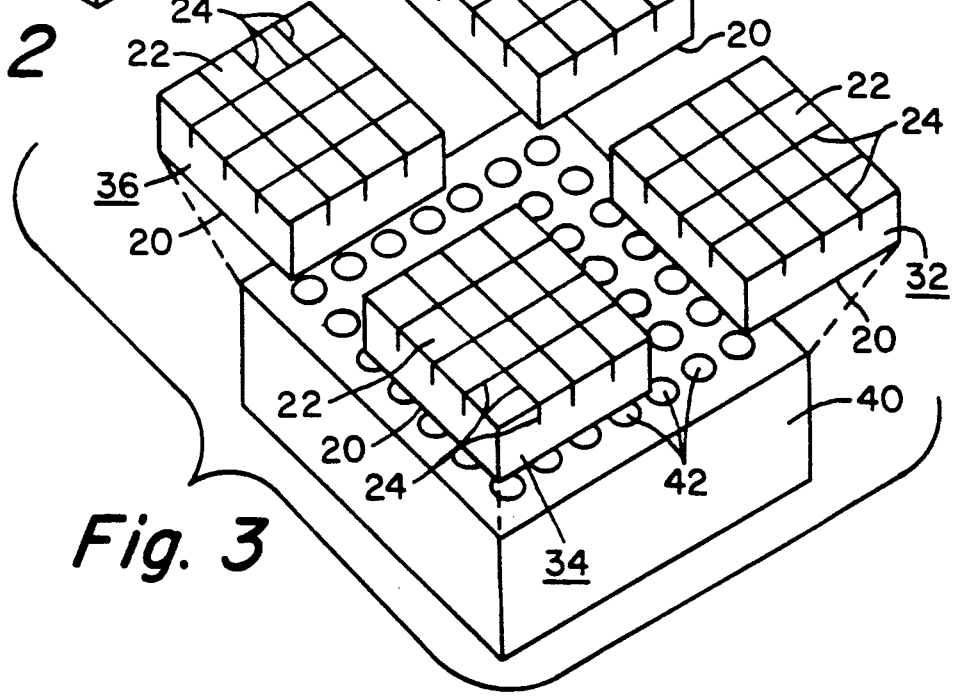
FIG. 3 is an exploded schematic perspective view of a further embodiment of a multi-part extrusion die.

FIG. 3 illustrates a further embodiment of a multi-part extrusion die 10 wherein the individual tiles or die parts 32, 34, 36 and 38 are each provided with wire EDM formed thin discharge slots 24 in the discharge face 22 and feed holes 26 (FIGS. 5 and 7) in the inlet face 20. However, such die parts need not be as thick as dies 12-18 of FIG. 1. The die parts 32-38 are positioned upon a thicker base plate 40 having matching feed holes 42 extending therethrough, which align with the feed holes 26 in the die parts 32, 34, 36 and 38. Any number of such small die parts may be placed on the same base plate to make up a full sized die. Once the individual die parts 32-38 are assembled and aligned on the base plate 40, the tiles may be brazed to the base plate. Again, the particular order to assembly is not important, as the tiles may be slotted, but not drilled, and then brazed to the base plate and the feed holes drilled in the entire assembly. Also, other fastening schemes may be employed such as soldering, fusion bonding, bolting and so forth.

Figure 4:
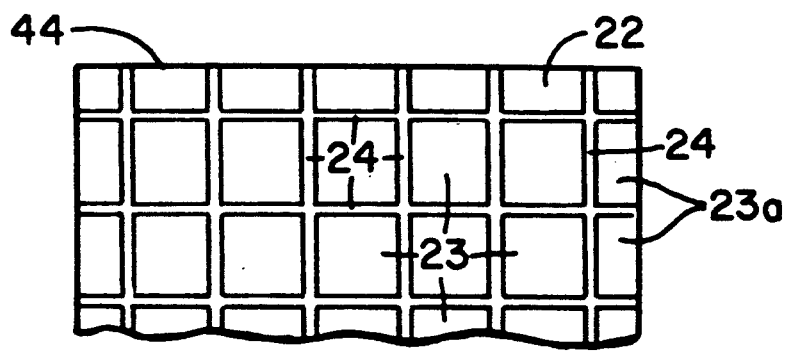
FIG. 4 is a schematic partial plan view of a die part.
Figure 5:
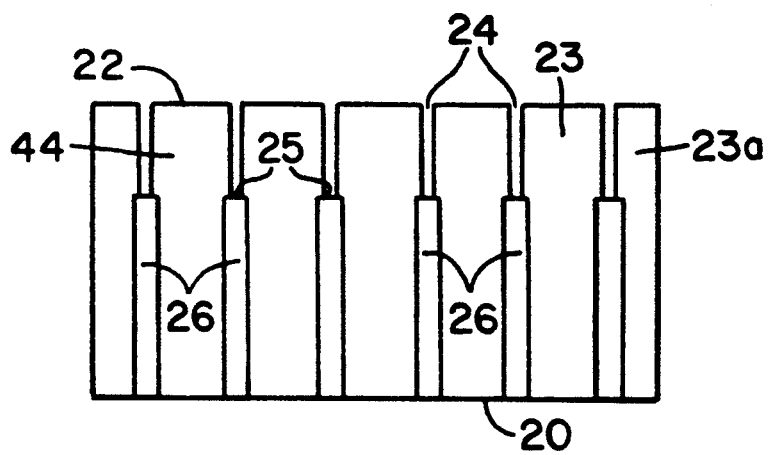
FIG. 5 is an elevational view of the die part shown in FIG. 4.

When assembling the various tiles or die parts such as 12-18 and 32-38, there are several methods of dealing with the contact line between adjacent tiles or die parts. In FIGS. 4 and 5, a die part or tile 44 is shown having the slots 24 formed therein so that the slots closest to the perimeter are only half as far from the perimeter as the interior slot spacing. Such tiles can be abutted against each other directly, leaving no indication of a contact line. However, whereas such slotting of the die part 44 as shown in FIGS. 4 and 5 produces full interior pins 23 between the slots 24, only half pins 23a are formed between the perimeter of the die part 44 and the nearest slot 24, and such half pins 23a, being relatively small, could be bent or broken before assembly.

Figure 6:
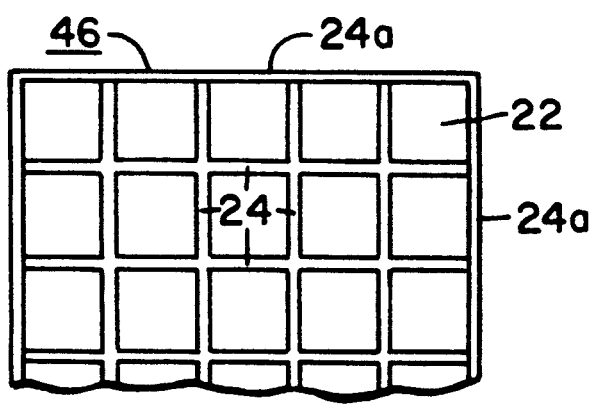
FIG. 6 is a schematic partial plan view of another form of a die part.
Figure 7:
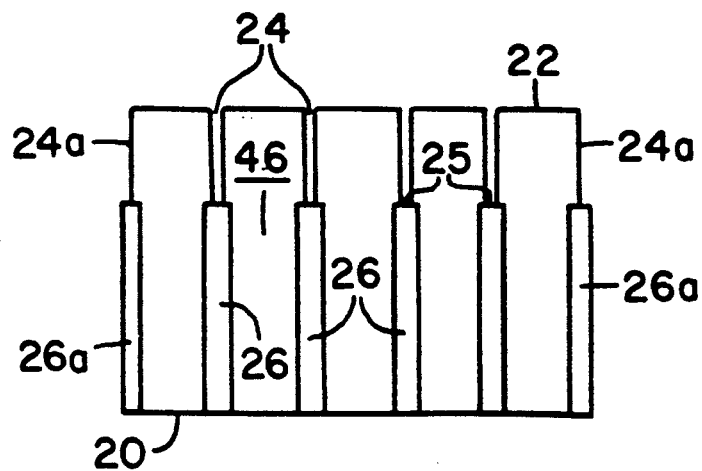
FIG. 7 is an elevational view of the die part shown in FIG. 6.

Referring now to FIGS. 6 and 7, a further die part or tile 46 is shown having slots 24 formed in the discharge face 22 so that the perimeter falls midway in the outer most slot 24a. A plurality of such tiles 46 may be abutted against each other with no indication of a contact line, and in addition there are no fragile projections left on the outermost edge. In addition, in view of the fact that outermost slot 24a forms half of a slot with an adjacent tile, such adjacent tiles thereby form a full slot. Likewise, only a partial feedhole 26a need be formed in the outer edge of the tile 46, since the adjacent tile will complete the necessary feed hole. In some instances, it may be desirable to have a pattern of thicker walls to improve the strength or stiffness of the extruded honeycomb structure, and this can be accomplished by leaving more of the perimeter slot 24a in the die part 46, or even cutting the slot initially with a larger wire to increase its size.

Due to the nature of the conventional slot forming operation, each slot placement and slot width must be the same across the die face to produce a constant cell density in any region of the die. However, the ability to produce a product with different cell densities or slot widths in various sections of the die to produce unique flow characteristics could be advantageous. Thus, by utilizing the present invention, a multi-part extrusion die may be formed having a different cell density or slot width in each of the multi-parts of the die.

Figure 8:
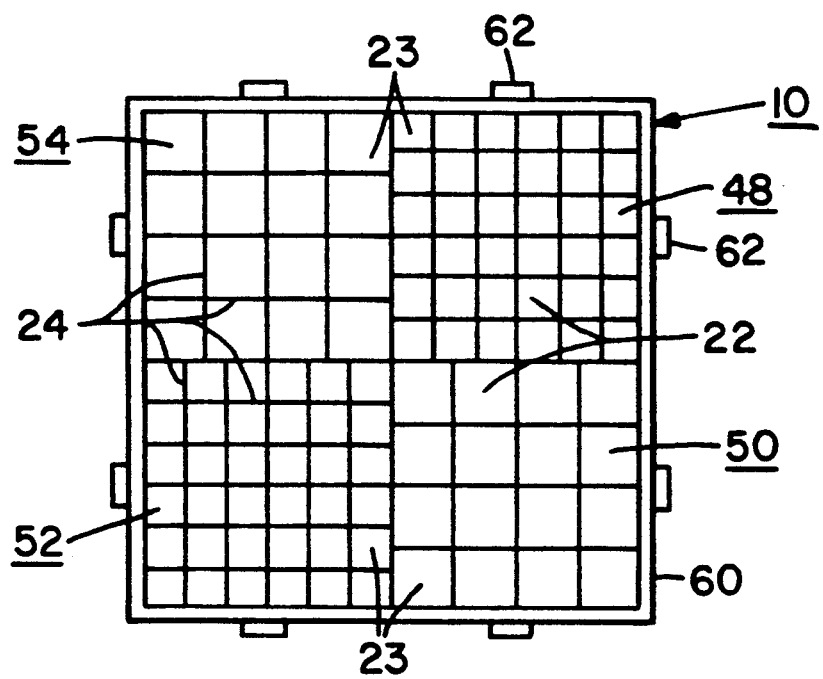
FIG. 8 is a plan view of a multi-part extrusion die.

Referring now to FIG. 8, a multi-part extrusion die 10 is shown including die parts or tiles 48, 50, 52, and 54. As noted, the pins 23 in the discharge face 22, between the discharge slots 24, are of various sizes so as to produce a different cell density across the extent of the multiple part extrusion die 10. Further, since each of the die parts 48-54 are individually formed with discharge slots 24, the width of the slots in each of the die parts may vary with respect to that of the other die parts. The various die parts 48-54 may be provided with tongues and grooves as shown in FIG. 1, and they may be positioned within a compression frame 60 having a plurality of locking screws 62 for compressably holding the die parts securely in position. The frame 60 could be a compression or shrink fit frame if so desired. Feed holes such as shown at 26 in FIGS. 5 and 7, are formed in the opposite face of the die parts 48-54 in communication with the interconnected discharge slots 24.

Figure 9:
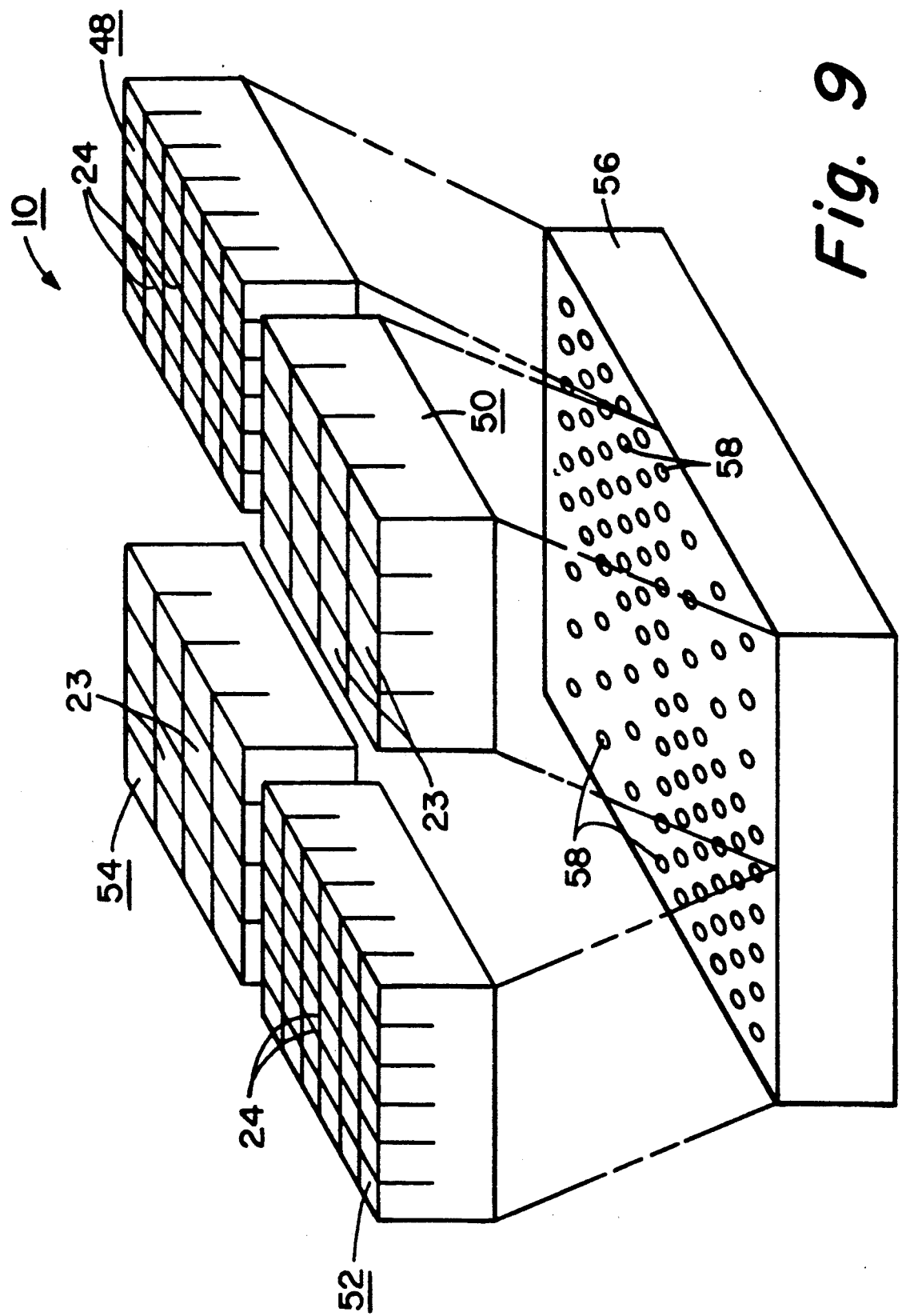
FIG. 9 is an exploded view showing how the die of FIG. 8 could be formed.

As shown in FIG. 9, the tiles or die parts 48-54 may be bonded to a suitable base plate 56 having feed holes 58 extending therethrough which have the necessary pattern for communicating with the feed holes 26 of each of the tiles or die parts 48-54. That is, the hole pattern 58 in the base plate 56 must correspond to the feed holes 26 within the die parts 48-54. Such alignment can be achieved through the use of pins or alignment means on the adjacent components. Although four tiles are shown in FIG. 9, more or fewer tiles can be used depending upon the need and desired application.

Figure 10:
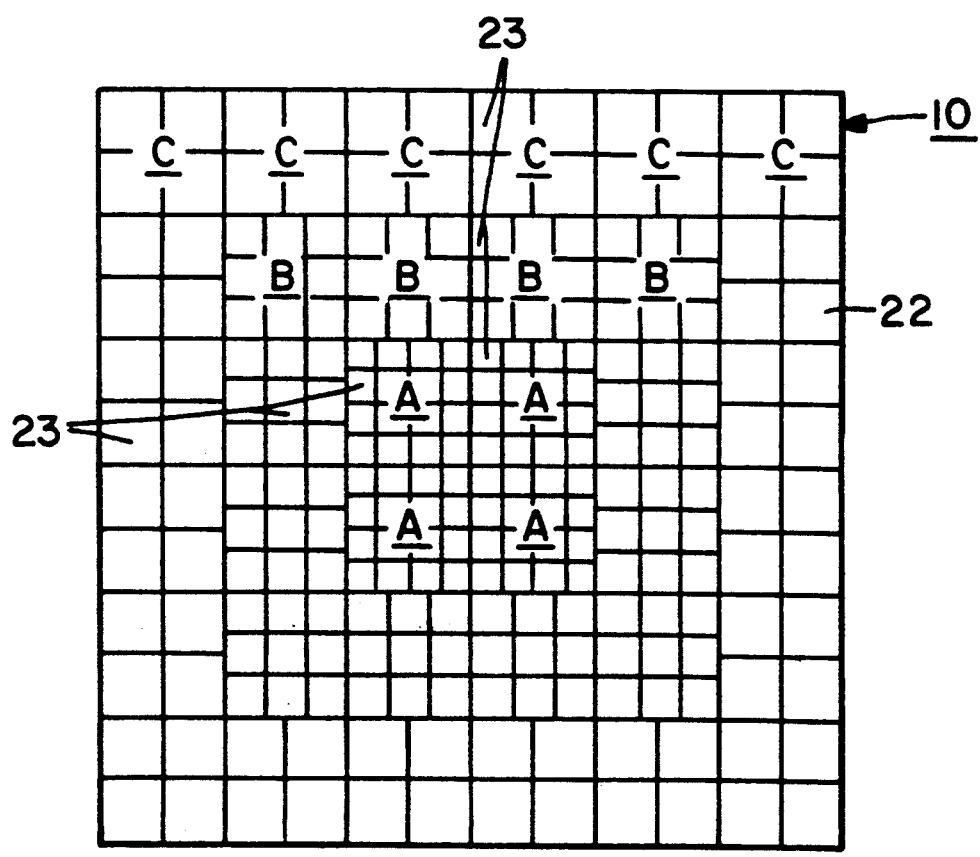
FIG. 10 is a plan view of a further embodiment of a multi-part extrusion die.

FIG. 10 represents a frame style or type of multi-part extrusion die 10, wherein the pattern formed by the various die parts has the appearance of a framed central portion. That is, the multiple-part extrusion die 10 shown in FIG. 10 has four central die parts A, each having sixteen pins 23 in the outlet or discharge face 22. The central die parts A are surrounded by twelve intermediate die parts B, each having nine pins 23 in their discharge face. Finally, the intermediate die parts B are surrounded by twenty outer die parts C, each having four pins 23. The various die parts A, B, and C may be held together by use of a compression frame such as 60 shown in FIG. 8, or may be bonded to a base plate 56 such as shown in FIG. 9. The tiles 48-54 of FIG. 8 and A-C of FIG. 10 may be formed in the same manner as the tiles or die parts 32-38 of FIG. 3, and provided with feed holes 26 such as shown in FIGS. 5 and 7.

Figure 11:
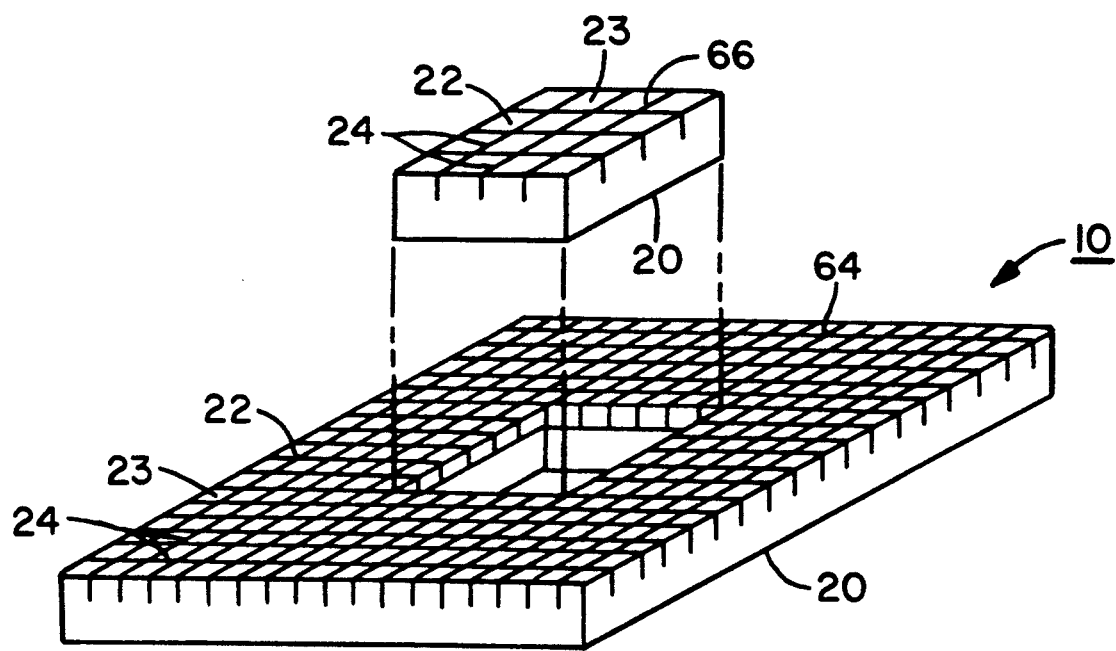
FIG. 11 is an exploded view illustrating one method of forming a die similar to that shown in FIG. 10.

FIG. 11 illustrates a multi-part extrusion die 10 wherein a frame-like tile or die part 64 is provided with a tile or die part 66, having a different cell density and/or slot width from that of the frame tile die part 64. The frame die part 64 may be formed similar to the frame parts C of FIG. 10. However, where the slot width of the frame part does not require thin slots 24, such part may be unitary, and the slots 24 may be formed therein by conventional wire EDM cutting. The central tile 66 may be provided with thin discharge slots 24 and a relatively large pin size 23, if desired. Although only one central die part 66 is shown, it will be appreciated that a plurality of such parts may be positioned within the central portion of the frame tile 64. Hereagain, the die positioned upon a base plate having feed holes aligned with those extending inwardly of the inlet face 20 of die parts 64 and 66.

The die parts are preferably made of wear resistant material such as stainless steel or easy machining cold rolled steel. Although the various die parts are shown to be similar to the cell configuration, that is square or rectangular for a square cell extrusion, it is possible to use a circular tile in a square cell extrusion. However, the latter requires some adjustment of the base hole pattern to accommodate areas of mismatch. Further, virtually any desired geometric shape cells may be utilized, such as rectangular and triangular, however, with triangular cells it is preferred to use hexagonal shaped tiles.

Although the now preferred embodiments of the invention have been disclosed, it will be apparent to those skilled in the art that various changes and modifications may be made thereto without departing from the spirit and scope of the invention as set forth in the appended claims.

We claim:

1. A multi-part extrusion die which comprises:
   a plurality of unitary one-piece die body parts forming a discharge face of said multi-part extrusion die,
   each of said unitary die body parts forming said discharge face having a plurality of interconnecting discharge slots formed in the discharge face of said unitary die body part and a plurality of feed holes formed in said unitary die body part from a face opposite said discharge and communicating with said discharge slots, and
   means for securing said plurality of unitary one-piece die body parts having said interconnected discharge slots and said feed holes formed therein together in desired alignment to form said multi-part extrusion die.

2. A multi-part extrusion die as defined in claim 1 wherein said means for securing said plurality of unitary die body parts together includes a compression fit frame about outer peripheral portions of said plurality of die parts.

3. A multi-part extrusion die as defined in claim 1 wherein said means for securing said plurality of unitary die body parts together includes a base plate, and said plural of die parts being secured in said desired alignment to a face of said base plate.

4. A multi-part extrusion die as defined in claim 3 wherein said plurality of unitary die body parts are secured to said base plate by brazing said plurality of die parts to said base plate.

5. A multi-part extrusion die as defined in claim 3 wherein said base plate is provided with a plurality of feed holes extending therethrough, and said feed holes being in alignment with said plurality of feed holes formed in said opposite face of each of said unitary die body parts.

6. A multi-part extrusion die as defined in claim 1 wherein said discharge slots formed in said discharge face of each of said unitary die body parts are of the same slot width as those in an adjacent die part.

7. A multi-part extrusion die as defined in claim 6 wherein said discharge slots of each of said adjacent unitary die body parts are in alignment with each other so as to form uniform continuous discharge slots across the discharge face of said multi-part extrusion die.

8. A multi-part extrusion die as defined in claim 1 wherein a plurality of die pins are formed between said plurality of discharge slots formed in the discharge face of each of said plurality of unitary die body parts, and said die pins of each of said die parts being of the same size and shape as those of an adjacent die part.

9. A multi-part extrusion die as defined in claim 1 wherein a plurality of die pins are formed between said plurality of discharge slots formed in the discharge face of each of said plurality of unitary die body parts, and said die pins of at least one of said plurality of unitary die body parts being of a different size from those of an adjacent die body part.

10. A multi-part extrusion die as defined in claim 9 wherein each of said plurality of unitary die body parts has at least one adjacent unitary die body part having die pins of a different size from that of said each die body part.

11. A multi-part extrusion die as defined in claim 1 wherein said discharge slots formed in said discharge face of each of said unitary die body parts are provided with a predetermined slot width which vary from die body part to die body part.

12. A multi-part extrusion die as defined in claim 1 wherein a plurality of said discharge slots and a plurality of said feed holes are formed within and bounded by a body portion of each of said unitary die body parts.

13. A multi-part extrusion die as defined in claim 1 wherein said discharge slots formed in the discharge face of each of said unitary die body parts includes a portion of a discharge slot formed in a perimeter of each of said unitary die body parts, such that an adjacent die body part completes the slot formed in the perimeter.

14. A multi-part extrusion die which comprises:
a plurality of die parts forming a discharge face of said multi-part extrusion die,
each of said die parts forming said discharge face having a plurality of interconnecting discharge slots formed in said discharge face and a plurality of feed holes formed in a face opposite said discharge face and communicating with said discharge slots, and
interconnecting tongue and groove means formed on adjacent die parts for securing said plurality of die parts together in desired alignment to form said multi-part extrusion die.

* * * * *